(12) United States Patent
Asakura et al.

(10) Patent No.: US 7,673,312 B2
(45) Date of Patent: Mar. 2, 2010

(54) CARTRIDGE FOR A PHOTOSENSITIVE RECORDING MEDIUM

(75) Inventors: Katsuyoshi Asakura, Minami-Ashigara (JP); Tomoyuki Takahashi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 512 days.

(21) Appl. No.: 11/657,599

(22) Filed: Jan. 25, 2007

(65) Prior Publication Data

US 2007/0174860 A1 Jul. 26, 2007

(30) Foreign Application Priority Data

Jan. 25, 2006 (JP) ............................. 2006-016550

(51) Int. Cl.
*G11B 23/03* (2006.01)
(52) U.S. Cl. ..................................... 720/741
(58) Field of Classification Search ................. None
See application file for complete search history.

(56) References Cited

U.S. PATENT DOCUMENTS 7,487,521 B2 * 2/2009 Kawasaki et al. ........... 720/718

2001/0010680 A1 8/2001 Kikuchi et al.
2003/0198177 A1 * 10/2003 Horimai et al. ............. 369/291
2006/0143642 A1 * 6/2006 Kawasaki et al. .......... 720/738
2008/0028421 A1 * 1/2008 Kawasaki et al. .......... 720/740

FOREIGN PATENT DOCUMENTS

| GB | 2255222 A | 10/1992 |
|---|---|---|
| JP | 2001-216754 | 8/2001 |
| JP | 2001-236754 | 8/2001 |
| JP | 2004-029476 | 1/2004 |

* cited by examiner

*Primary Examiner*—Mark Blouin
(74) *Attorney, Agent, or Firm*—Sughrue Mion, PLLC

(57) ABSTRACT

A light shield plate 12 having outer openings 14 and 15 is fixed to the outside of a cartridge body 11 in which inner openings 18 and 19 for exposing a photosensitive recording medium 4 to the outside are formed. A shutter 13 for opening and closing the inner openings 18 and 19 is incorporated movably between the cartridge body 11 and the light shield plate 12. Closing-side ends 55e and 55f of the shutter 13 and shutter-closing-side edges 18a and 19a of the inner openings 18 and 19 and/or shutter-closing-side edges 14a and 15a of the outer openings 14 and 15 are inclined from each other.

2 Claims, 11 Drawing Sheets

CARTRIDGE FOR A PHOTOSENSITIVE RECORDING MEDIUM

FIELD OF THE INVENTION

The present invention relates to a cartridge for a photosensitive recording medium. More particularly, the invention relates to a cartridge for a photosensitive recording medium in which a shutter is allowed to be opened smoothly by preventing the shutter from interfering with an inner opening and/or an outer opening in a shutter closing operation.

BACKGROUND OF THE INVENTION

A hologram recording medium on which data are recorded as a hologram was invented (refer to JP-A-2004-029476, for example). Being a photosensitive recording medium in which hologram recording layers made of a photosensitive material are formed on a disc-shaped support, this hologram recording medium has a larger recording capacity than the conventional DVD which is now a popular recording medium because data are recorded in multiple layers as interference fringes of laser light. This hologram recording medium is housed in a cartridge that is similar to the DVD-RAM cartridge having a light shield function and a dust-proof function, because its performance is affected adversely if the hologram recording layers are exposed light or dust is stuck thereto.

Among cartridges for housing a disc-shaped recording medium is a cartridge that is equipped with a cartridge body having an opening for exposing the disc-shaped recording medium to the outside and a shutter for opening and closing the opening (refer to JP-A-2001-216754 (US 2001/0010680 A1), for example) and a cartridge in which a light shield plate is additionally provided outside a shutter (refer to JP-A-2001-236754, for example).

SUMMARY OF THE INVENTION

The cartridge for housing the disc-shaped recording medium which is disclosed in JP-A-2004-029476 is equipped with a cartridge body and a shutter for attaining proper light shielding and protection against dust for the disc-shaped recording medium. The shutter is opened and closed at the time of data writing or reading. However, JP-A-2004-029476 has no disclosure about a shutter structure.

In the disc cartridges of JP-A-2001-216754 (US 2001/0010680 A1) and JP-A-2001-236754, it seems that a shutter-closing-side end of the shutter and shutter-closing-side edges of an inner opening and an outer opening are parallel with each other, though these documents have no specific disclosure to that effect. Where the ends (in particular, the shutter-closing-side ends) of the shutter and the edges (in particular, the shutter-closing-side edges) of the inner opening and/or the outer opening are parallel with each other, when the shutter is moved in the closing direction from an open state, the shutter-closing-side end of the shutter may interfere with the shutter-closing-side edges of the inner opening and/or the outer opening and the shutter closing operation may thereby be obstructed. In an extreme case, the former interferes with the latter over the entire length and the shutter is kept open, in which case the hologram recording medium may be exposed light and rendered unusable.

The present invention has been made in view of the above circumstances, and an object of the invention is therefore to provide a cartridge for a photosensitive recording medium capable of preventing a hologram recording medium from being exposed to light by reliably preventing a shutter-closing-side end of a shutter from interfering with shutter-closing-side edges of an inner opening and/or outer opening and thereby preventing the shutter from being kept open.

The above object of the invention is attained by the following cartridge for a photosensitive recording medium.

(1) A cartridge for a photosensitive recording medium provided with a photosensitive recording medium, a cartridge body having a disc accommodation space for accommodating the photosensitive recording medium rotatably and having an inner opening for exposing a central portion and a recording surface of the photosensitive recording medium to the outside, a light shield plate having an outer opening and fixed to the outside of the cartridge body, and a shutter which is disposed between the cartridge body and the light shield plate and is movable between a closing position where to close the inner opening and an opening position where to open the inner opening, characterized in that a closing-side end of the shutter and closing-side edges of the inner opening and/or the outer opening are inclined from each other.

In the cartridge for a photosensitive recording medium having the above configuration, the light shield plate having the outer opening is fixed to the outside surfaces of the cartridge body having the inner opening for exposing the photosensitive recording medium to the outside, and the shutter is incorporated between the cartridge body and the light shield plate and opens and closes the inner opening. The closing-side end of the shutter and the closing-side edges of the inner opening and/or the outer opening are inclined from each other. With this configuration, when the shutter is moved in the closing direction, in a plan view, the closing-side end of the shutter always intersects the closing-side edge of the inner opening and/or the closing-side edge of the outer opening at one point. The closing-side end of the shutter is reliably prevented from interfering with the closing-side edge of the inner opening and/or the closing-side edge of the outer opening. As a result, the shutter is moved in the closing direction without being obstructed by the inner opening and/or the outer opening, and hence is closed smoothly. A hologram recording medium is prevented from being exposed to light inadvertently.

(2) The cartridge for a photosensitive recording medium according to the above item (1) characterized in that a cartridge-inserting-side width and a cartridge-removing-side width of the shutter are different from each other, whereby the closing-side end of the shutter and the closing-side edges of the inner opening and/or the outer opening are inclined from each other.

In the cartridge for a photosensitive recording medium having the above configuration, the cartridge-inserting-side width and the cartridge-removing-side width of the shutter are different from each other. The closing-side end of the shutter and the closing-side edges of the inner opening and/or the outer opening can thus be inclined from each other by a simple mechanism. As a result, the closing-side end of the shutter can be prevented from interfering with the closing-side edge of the inner opening and/or the closing-side edge of the outer opening and the shutter can be closed smoothly.

(3) The cartridge for a photosensitive recording medium according to the above item (1), characterized in that cartridge-inserting-side widths of the inner opening and/or the outer opening and cartridge-removing-side widths of the inner opening and/or the outer opening are different from each other, whereby the closing-side end of the shutter and the closing-side edges of the inner opening and/or the outer opening are inclined from each other.

In the cartridge for a photosensitive recording medium having the above configuration, the cartridge-inserting-side widths of the inner opening and/or the outer opening and cartridge-removing-side widths of the inner opening and/or the outer opening are different from each other. The closing-side end of the shutter and the closing-side edges of the inner opening and/or the outer opening can thus be inclined from each other by q simple mechanism. As a result, the closing-side end of the shutter can be prevented from interfering with the closing-side edge of the inner opening and/or the closing-side edge of the outer opening and the shutter can be closed smoothly.

In the cartridge for a photosensitive recording medium according to the invention, the closing-side end of the shutter and the closing-side edge of the inner opening of the cartridge body and/or the closing-side edge of the outer opening of the light shield plate are inclined from each other. Therefore, in a plan view, the closing-side end of the shutter always intersects the closing-side edge of the inner opening and/or the closing-side, edge of the outer opening at one point. The closing-side end of the shutter does not interfere with and, instead, is guided by the closing-side edge of the inner opening and/or the outer opening; the shutter is thus closed. As a result, the shutter is closed smoothly and a hologram recording medium is prevented from being exposed to light inadvertently.

BRIEF DESCRIPTION OF THE DRAWINGS

FIGS. 4A, 4B and 4C are sectional views taken along line IV-IV in FIG. 1 and as viewed in the direction indicated by arrows in which FIG. 4A is an overall view, FIG. 4B is an enlarged view of a front peripheral portion, and FIG. 4C is an enlarged view of a rear peripheral portion.

DETAILED DESCRIPTION OF THE INVENTION

Figure 1:
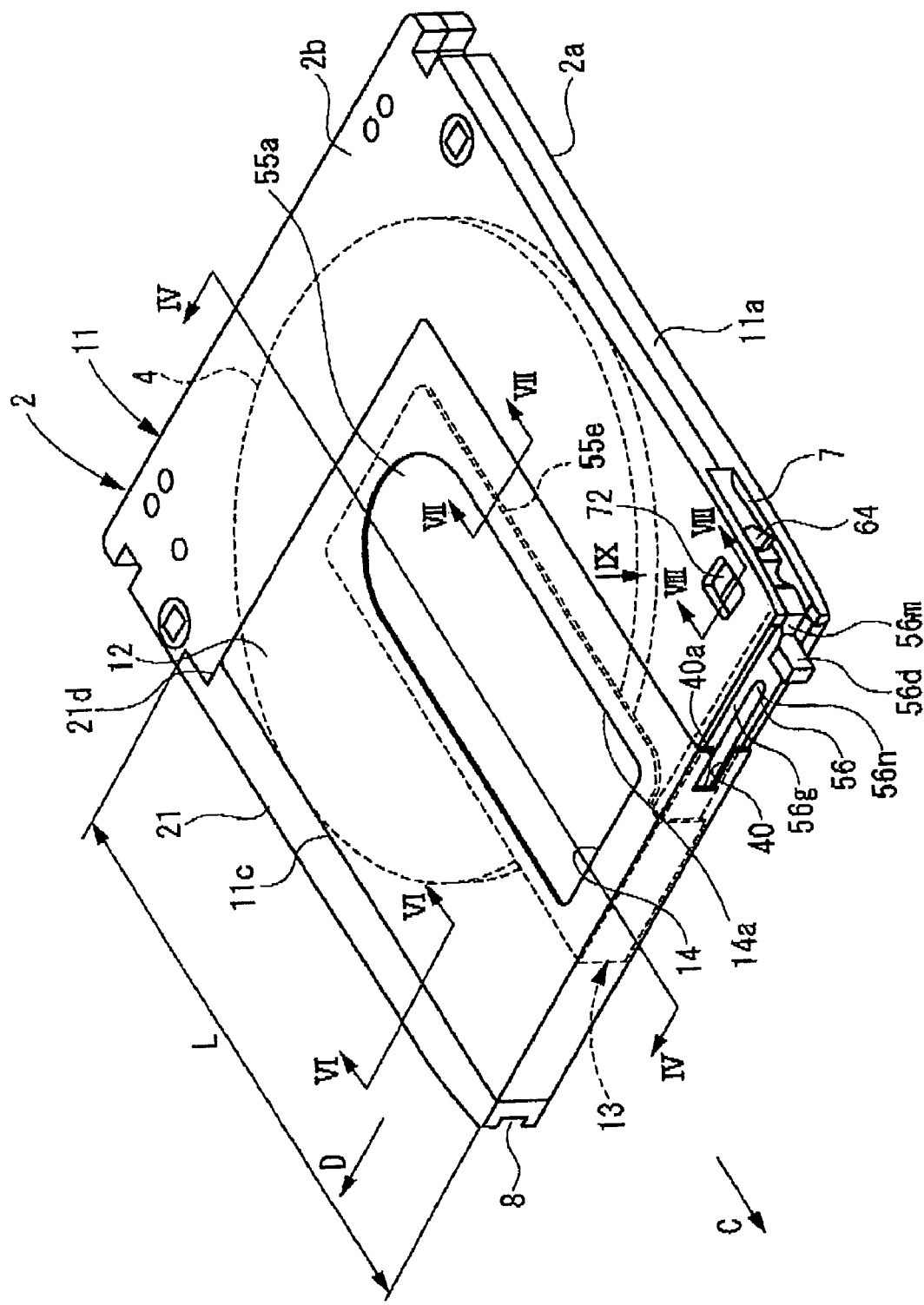
FIG. 1 is a perspective view showing an outward shape of a cartridge as an embodiment of the present invention.
Figure 2:
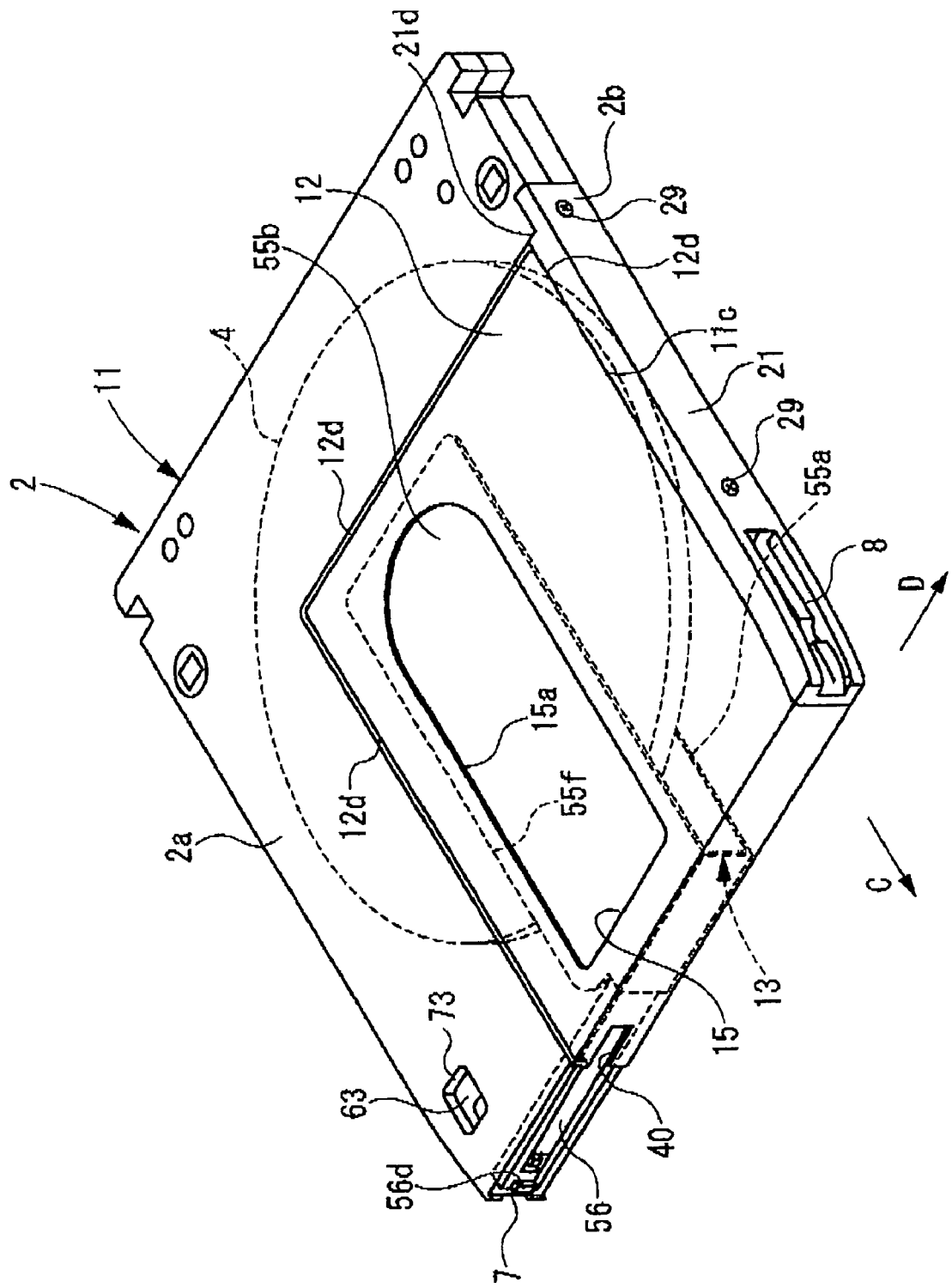
FIG. 2 is a perspective view of the cartridge as viewed from the opposite side.
Figure 3:
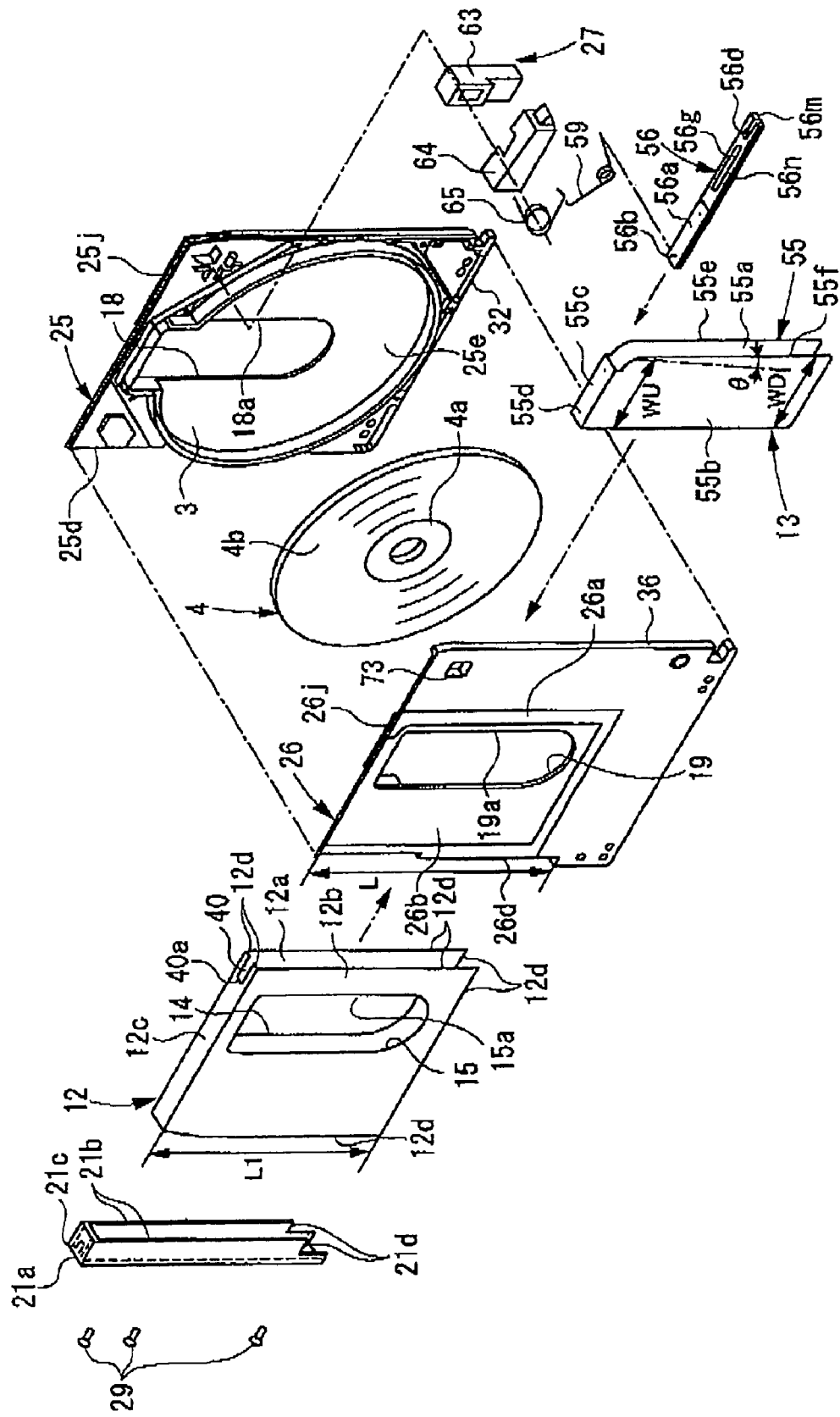
FIG. 3 is an exploded perspective view showing the configuration of the cartridge.
Figure 4A:
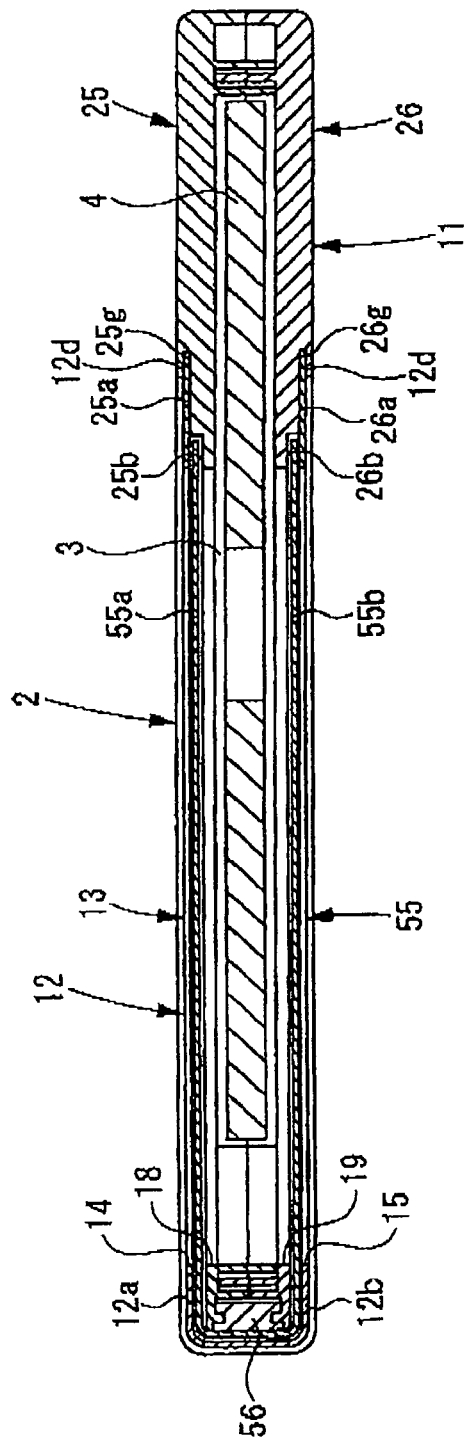
Figure 4C:
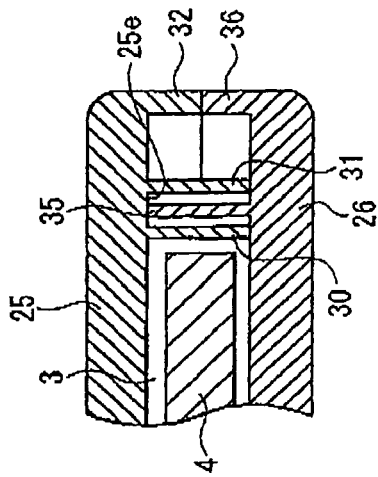
Figure 4B:
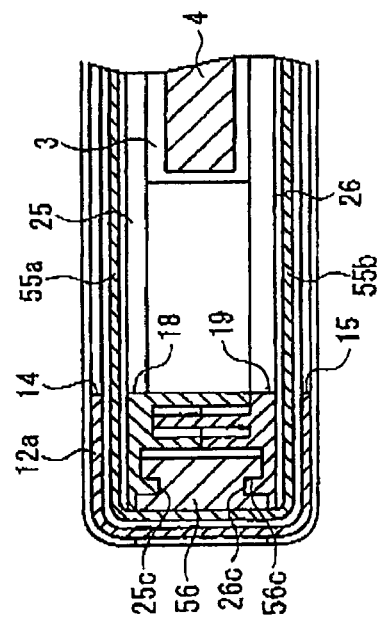
Figure 5:
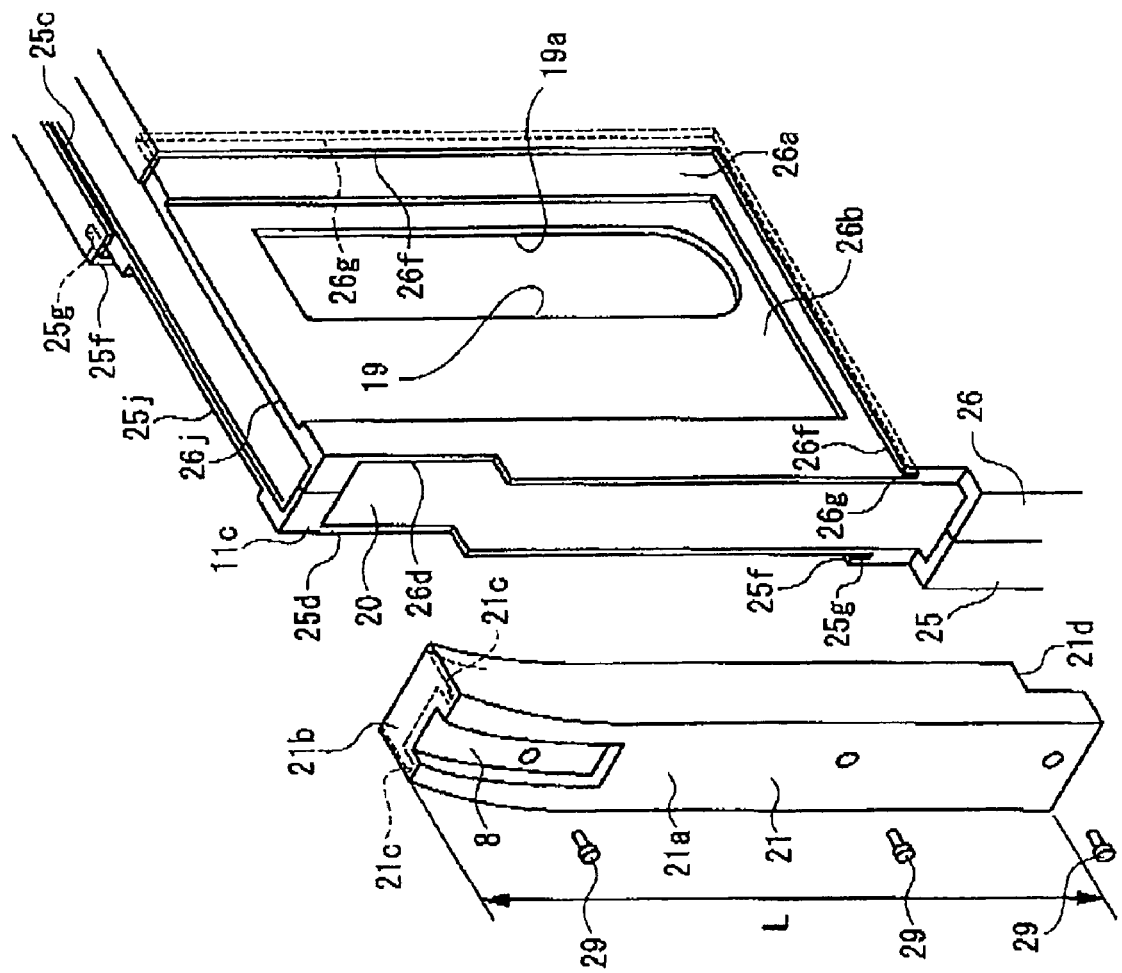
FIG. 5 is an enlarged exploded perspective view of an important part of the cartridge excluding a shutter and a light shield plate.
Figure 6:
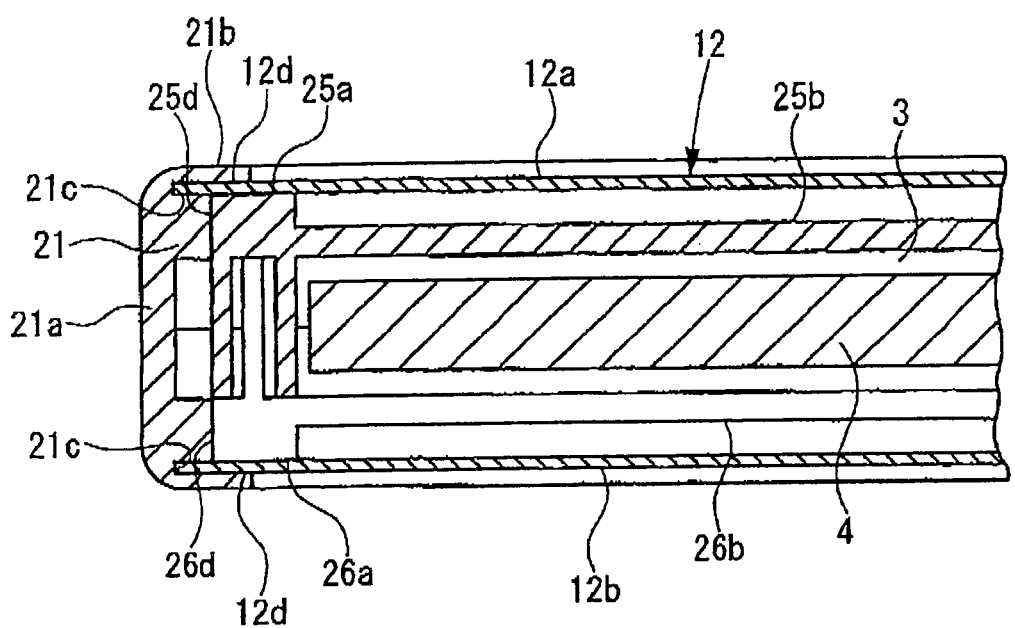
FIG. 6 is a sectional view taken along line VI-VI in FIG. 1 and as viewed in the direction indicated by arrows.
Figure 7:
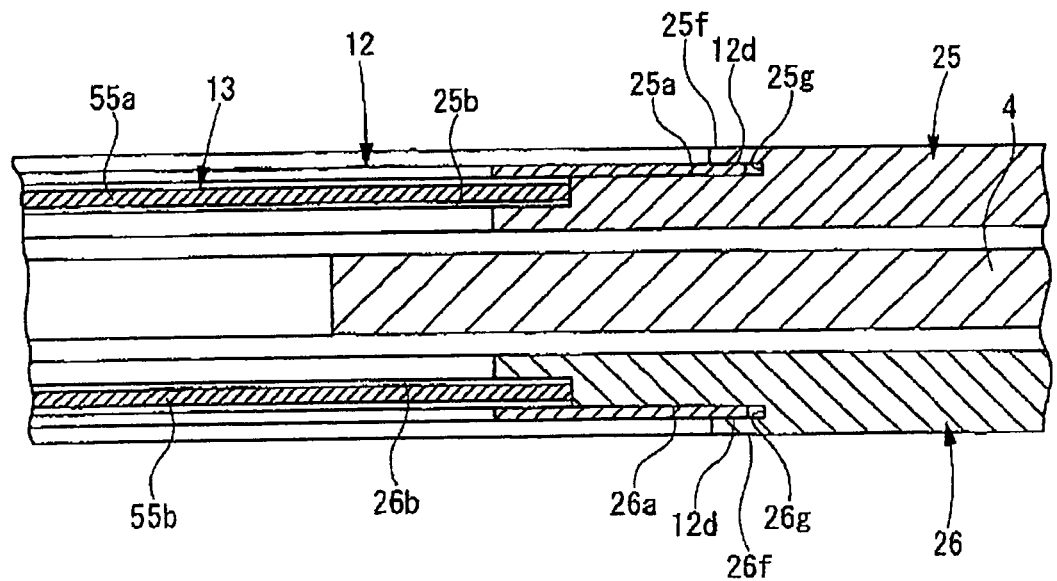
FIG. 7 is a sectional view taken along line VII-VII in FIG. 1 and as viewed in the direction indicated by arrows.

An embodiment of the present invention will be hereinafter described in detail with reference to the drawings. FIG. 1 is a perspective view of a cartridge for a hologram recording medium (hereinafter abbreviated as "cartridge") according to the embodiment of the invention. FIG. 2 is a perspective view of the cartridge as viewed from the opposite side. FIG. 3 is an exploded perspective view showing the configuration of the cartridge. FIGS. 4A, 4B and 4C are sectional views taken along line IV-IV in FIG. 1 and as viewed in the direction indicated by arrows in which FIG. 4A is an overall view, FIG. 4B is an enlarged view of a front peripheral portion, and FIG. 4C is an enlarged view of a rear peripheral portion. FIG. 5 is an enlarged exploded perspective view of an important part of the cartridge excluding a shutter and a light shield plate. FIG. 6 is a sectional view taken along line VI-VI in FIG. 1 and as viewed in the direction indicated by arrows. FIG. 7 is a sectional view taken along line VII-VII in FIG. 1 and as viewed in the direction indicated by arrows.

As shown in FIGS. 1, 2 and 3, a cartridge 2 is inserted, in the direction indicated by arrow C, into a hologram recording apparatus or the like which handles the cartridge 2. Positioning grooves 7 and 8 into which positioning members of each apparatus such as a hologram recording apparatus are inserted when the cartridge 2 is inserted into the apparatus are provided in inserting-side portions (front portions) of the two side surfaces of the cartridge 2, respectively.

A photosensitive recording medium (hereinafter referred to as "recording disc") 4 which is provided rotatably in a disc accommodation space 3 of the cartridge 2 is a disc-shaped hologram recording disc having a center hole. Hologram recording layers are provided on each of the two surfaces of the recording disc 4. Data are multiple-layer recorded in the hologram recording layers as interference fringes of laser light by using laser light in a wavelength range of, for example, 532 nm (green) to 405 nm (blue). A reinforcement member may be added in the hole of the recording disc 4. To enable recording on both recording surfaces of the recording disc 4, the cartridge 2 can be set in a hologram recording apparatus with either of an A-surface 2a and a B-surface 2b up.

The cartridge 2 is equipped with a cartridge body 11 having the disc accommodation space 3, a lid 21 which closes an opening 20 that is formed in a side surface 11c of the cartridge body 11, a light shield plate 12 which is attached to (fitted with) the cartridge body 11, and a shutter 13 which is incorporated between the cartridge body 11 and the light shield plate 12. Generally rectangular outer openings 14 and 15 as second openings are formed through the top and bottom walls of the light shield plate 12, respectively. The outer openings 14 and 15 are closed by a first shutter 55a and a second shutter 55b, respectively, when the shutter 13 is located at the closing position.

When the shutter 13 is moved in the direction indicated arrow D toward the opening position, inner openings 18 and 19 having the same shape which are formed in the cartridge body 11 so as to face the outer openings 14 and 15 are opened together with the outer openings 14 and 15, whereby a central portion 4a and part of each of recording surfaces 4b of the recording disc 4 accommodated in the disc accommodation space 3 are exposed to the outside.

The shutter 13 is urged toward the closing position by a built-in shutter spring and locked at the closing position by a lock mechanism 27. The lock mechanism 27 is unlocked by pushing, into the cartridge 2, that portion of a second lock member 64 which projects into the positioning groove 7 and, in that state, sliding, in the cartridge removing direction, a first lock member 63 which is partially exposed through openings 73 and 72 of the A-surface 2a and the B-surface 2b. Since the shutter 13 is locked at the closing position by the lock mechanism 27 which cannot be unlocked without performing such two-step manipulations, the shutter 13 is never opened inadvertently.

As shown in FIG. 3, the cartridge body 11 is composed of a generally plate-like first shell 25, a second shell 26 which is joined to the first shell 25, and the lock mechanism 27 which is incorporated between the first shell 25 and the second shell 26 and serves to lock the shutter 13.

The first shell 25 and the second shell 26 are formed by injection molding by using the same or similar thermoplastic plastic materials containing an opaque substance and a lubricant. As shown in FIG. 4C which is an enlarged sectional view of a rear peripheral portion of the cartridge 2, the inside surface of the first shell 25 is formed with a first light shield wall 30 which is a projection strip whose diameter is larger than the outer diameter of the recording disc 4, a second light shield wall 31 which is disposed outside the first light shield wall 30, and a projection strip 32 which extends along the periphery of the three sidelines (i.e., the sidelines excluding the one corresponding to a side edge 25d). The inner opening 18 for exposing the central portion 4a and part of the recording surface 4b of the recording disc 4 is formed inside the first light shield wall 30. An inner opening closing-side edge 18a which is the shutter-closing-side edge of the inner opening 18 is approximately perpendicular to a front end surface 25j of the first shell 25.

The inside surface of the second shell 26 is formed with a third light shield wall 35 which is inserted between the first light shield wall 30 and the second light shield wall 31 of the first shell 25 and a projection strip 36 which extends along the periphery of the three sidelines (i.e., the sidelines excluding the one corresponding to a side edge 26d). The inner opening 19 for exposing the central portion 4a and part of the recording surface 4b of the recording disc 4 is formed inside the third light shield wall 35. An inner opening closing-side edge 19a which is the shutter-closing-side edge of the inner opening 19 is approximately perpendicular to a front end surface 26j of the second shell 25.

When the recording disc 4 is placed inside the third light shield wall 35 of the second shell 26 and the first shell 25 is put on the second shell 26, the third light shield wall 35 is inserted between the first light shield wall 30 and the second light shield wall 31 and the tip of the third light shield wall 35 touches an inside surface 25e of the first shell 25. The disc accommodation space 3 is formed by the light shield walls 31, 32, and 35 and the inside surfaces of the first shell 25 and the second shell 26.

The side wall of the disc accommodation space 3 has a labyrinth-shaped light shield structure in which the three light shield walls 30, 31, and 35 are interlaced with each other. Therefore, even if light or dust enters the cartridge 2 through the boundary between the first shell 25 and the second shell 26, it does not go into the disc accommodation space 3. Furthermore, since the first shell 25 and the second shell 26 are fixed to each other strongly with screws, no gap is formed at the boundary between them. The tip of the third light shield wall 35 may be welded to the inside surface 25e of the first shell 25 by ultrasonic welding, in which case the light shield performance is enhanced further.

When the first shell 25 and the second shell 26 are placed on and joined to each other, the opening 20 which directly communicates with the outside is formed in the side surface 11c which is formed by the side edges 25d and 26d (see FIG. 5) which are absent from the projection strips 32 and 36. The length L of the opening 20 is greater than the length L1 of opening-20-side ends 12d of the light shield plate 12.

As shown in FIGS. 3 to 7, the outside surfaces of the first shell 25 and the second shell 26 have light shield plate attachment surfaces 25a and 26a, respectively, which are slightly wider than the light shield plate 12 and are offset inward by a length that is greater than the thickness of the light shield plate 12. The opening-20-side ends of the light shield plate attachment surfaces 25a and 26a are continuous with the side edges 25d and 26d without formation of steps, respectively. A light shield plate accommodation groove 25g or 26g is formed at the periphery of the two sidelines (i.e., the sidelines excluding the ones corresponding to the opening 20 and the cartridge-2-inserting-side end (front end)) of each of the light shield plate attachment surfaces 25a and 26a. When the light shield plate 12 is attached to the light shield plate attachment surfaces 25a and 26a, the light shield plate accommodation grooves 25g and 26g are fitted with the ends 12d of the light shield plate 12 to form labyrinths.

As shown in FIGS. 1 to 3, 5, and 6, the lid 21 is fitted with the portion around the opening 20 and fixed with screws 29, whereby the opening 20 is closed. The lid 21 is a generally rectangular-parallelepiped-shaped box having a closed bottom whose length is the same as the length L of the opening 20. A rectangular-plate-like main body 21a and a rib 21b that erect from the three sidelines (corresponding to the cartridge-body-11-inserting-side end (front end) and both side ends) of the main body 21a are integrated with each other. Lid grooves 21c are formed inside the joining portions of the main body 21a and the rib 21b. Bottom portion, in the longitudinal direction of the lid 21, of the rib 21b is reduced in height to form step portions 21d. When the lid 21 is attached to the portion around the opening 20, the ends 12d of the light shield plate 12 are fitted with the lid grooves 21c to form labyrinths.

The light shield plate 12 is made of a material that provides light shielding ability, corrosion resistance, decorativeness, and workability and is light and strong, such as an aluminum alloy. The light shield plate 12 may be made of plastics, in which case to secure light shielding ability and slidability of the shutter 13 it is preferable to add an opaque substance and a lubricant.

As shown in FIG. 3, the light shield plate 12 is formed by forming, in an aluminum alloy thin plate, the outer openings 14 and 15 and a cut 40 for securing a necessary movable range of the shutter 13 and then bending the thin plate so that it will have a generally bracket-shaped cross section. As a result, the light shield plate 12 is given a first plate portion 12a and a second plate portion 12b having the respective outer openings 14 and 15 and a third plate portion 12c which has the cut 40 and connects the first plate portion 12a and the second plate portion 12b. Outer opening closing-side ends 14a and 15a which are the shutter-closing-side ends of the outer openings 14 and 15 are perpendicular to the third plate portion 12c. As a result, when the light shield plate 12 is fixed to the cartridge body 11, the outer opening closing-side ends 14a and 15a are made approximately perpendicular to the front end surfaces 25j and 26j of the cartridge body 11.

The light shield plate 12 is attached to the shield plate attachment surfaces 25a and 26a of the cartridge body 11 from the opening 20 side in such a manner that the B-surface 2b and the A-surface 2a of the cartridge body 11 are interposed between the first plate portion 12a and the second plate portion 12b and the tip of the cartridge body 11 in the inserting direction C is covered with the third plate portion 12c. Then, the lid 21 is screwed to the portion around the opening 20. The step portions 21d of the lid 21 are brought into contact with and attached to the opening-20-side ends of ribs 25f and 26f which define the light shield plate accommodation grooves 25g and 26g. As a result, the opening-20-side corner portions of the light shield plate 12 are covered reliably, whereby sideways entrance of light can be prevented.

The ends 12d of the light shield plate 12 are fitted into the light shield plate accommodation grooves 25g and 26g and the lid grooves 21c and are thereby fixed. As a result, the opening 20 is closed by the lid 21 and light shielding is attained reliably by the labyrinths which are formed by the ends 12d, the light shield plate accommodation grooves 25g and 26g, and the lid grooves 21c. The light shield plate 12 is fixed in such a manner that a gap for allowing a sliding movement of the shutter 13 is secured between the light shield plate 12 and the outside surfaces of the cartridge body 11 (first shell 25 and second shell 26).

The bracket-shaped light shield plate 12 is attached to the cartridge body 11 from the opening 20 side without being widened, which prevents deterioration in light shielding ability due to deformation of the light shield plate 12. Furthermore, since the light shield plate 12 is fixed in such a manner that its ends 12d are fitted into the light shield plate accommodation grooves 25g and 26g and the lid grooves 21c, screwing is not necessary, whereby the number of parts is reduced and the assembling is made easier.

Still further, since the opening 20 is covered with the lid 21, even if a certain gap exists between the two shells 25 and 26 of the cartridge body 11, high light shielding ability is secured because the gap is closed with the lid 21. In addition, since the light shield plate attachment surfaces 25a and 26a are offset inward by the length that is greater than the thickness of the light shield plate 12, the outside surfaces of the light shield plate 12 attached to the cartridge body 11 do not project from the surfaces of the cartridge 2.

As shown in FIG. 3, the shutter 13 is composed of a shutter member 55 formed by bending an opaque thin plate into a generally bracket shape and a long and narrow, plate-like slide member 56 which is attached to the shutter member 55. And the shutter 13 is urged by a shutter spring 59 in such a direction as to close the inner openings 18 and 19. The shutter spring 59 is a torsion coil spring, for example, and its two ends are hooked on the slide member 56 and the inside surface of the first shell 25.

For the same reasons described above for the light shield plate 12, the shutter member 55 is made of an aluminum alloy, for example. The shutter member 55 may also be made of plastics, In this case, to secure light shielding ability and slidability, as in the case of the light shield plate 12, it is preferable to add an opaque substance and a lubricant. In this embodiment, the shutter member 55 is made of plastics containing an opaque substance and a lubricant.

The shutter member 55 is composed of the first shutter 55a which is inserted between the outside surface of the first shell 25 and the first plate portion 12a of the light shield plate 12, the second shutter 55b which is inserted between the outside surface of the second shell 26 and the second plate portion 12b of the light shield plate 12, and a connecting portion 55c which connects the first shutter 55a and the second shutter 55b and to which the slide member 56 is attached.

The bottom width WD of each of the first shutter 55a and the second shutter 55b is greater than its top width WU. As a result, shutter-closing-side ends 55e and 55f of the first shutter 55a and the second shutter 55b are inclined from the line perpendicular to the connecting portion 55c by an angle θ. On the other hand, the inner opening closing-side edges 18a and 19a of the inner openings 18 and 19 of the first shell 25 and the second shell 26 and the outer opening closing-side edges 14a and 15a of the outer openings 14 and 15 of the light shield plate 12 are not inclined.

The outside surfaces of the first shell 25 and the second shell 26 have shutter sliding surfaces 25b and 26b which are offset inward from the light shield plate attachment surfaces 25a and 26a, respectively, by a length that is greater than the thickness of the shutter member 55. The shutter 13 is attached to the shutter sliding surfaces 25b and 26b. As a result, the shutter 13 can move smoothly between the cartridge body 11 and the light shield plate 12 and hence the generation of shavings etc. due to movements can be suppressed. To diffuse incident light, the shutter sliding surfaces 25b and 26b may be rough surfaces. Likewise, the inside surfaces of the light shield plate 12 and the inside surfaces and the outside surfaces of the shutter 13 may also be rough surfaces.

The slide member 56 is incorporated slidably between the first shell 25 and the second shell 26 in such a manner that part of its cartridge-2-inserting-side surface (front surface) 56g is exposed through the opening of the inserting-side surface (tip surface) of the cartridge body 11. One end portion of the front surface 56g of the slide member 56 is an attachment surface 56a which is attached to the inside surface of the connecting portion 55c of the shutter member 55. Two pins 56b, for example, are formed integrally on the attachment surface 56a. The slide member 56 is fastened to the shutter member 55 by inserting the pins 56b into two holes 55d of the connecting portion 55c and melting down the tip portions of the pins 56b by heat. Alternatively, the slide member 56 may be fastened to the shutter member 55 by using an adhesive, a double-sided adhesive tape, or the like. Where the shutter member 55 is made of plastics, one of various kinds of welding may be used. Screwing is also possible.

Figure 10:
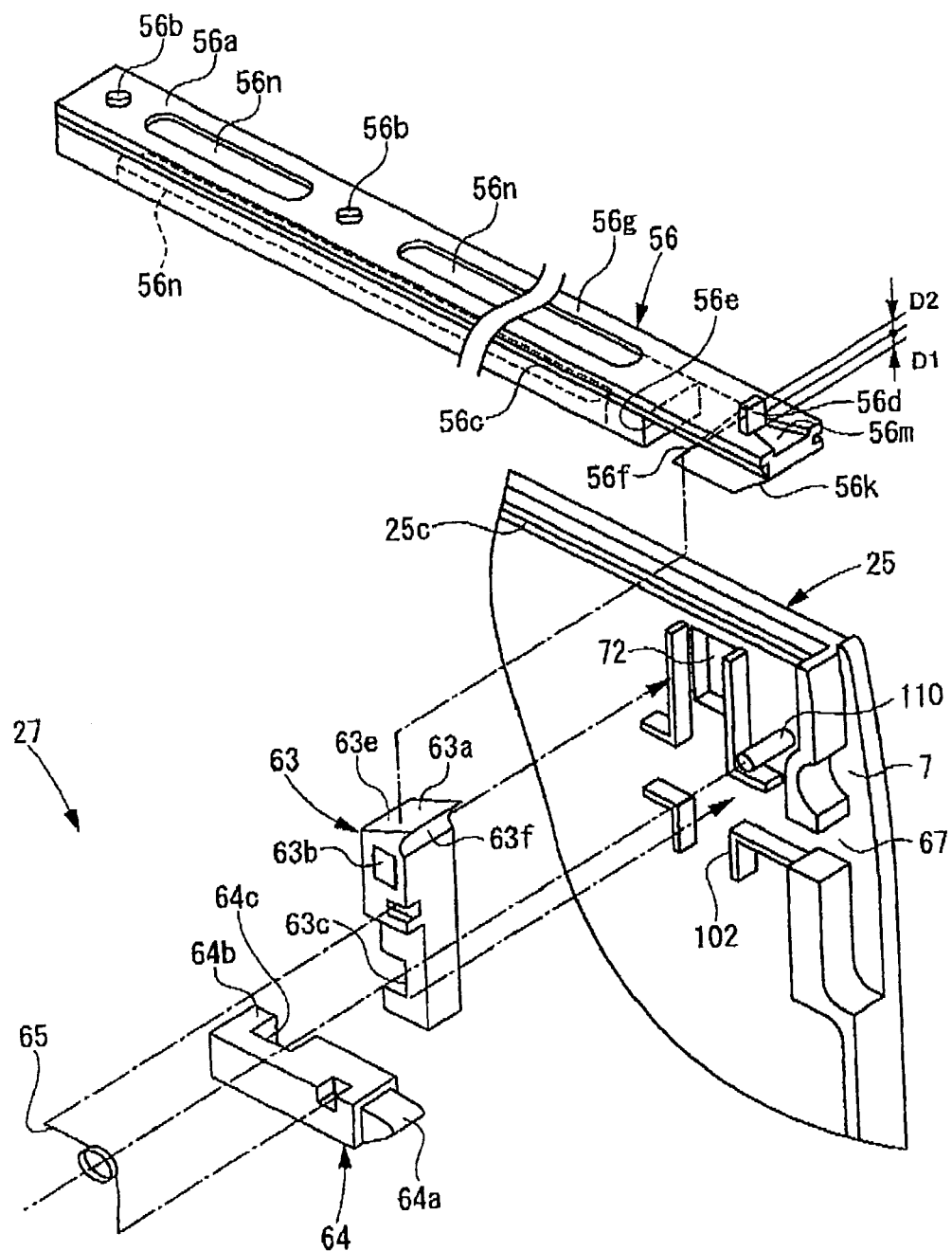
FIG. 10 is an exploded perspective view showing the structure of a lock mechanism.

As shown in FIG. 4B and FIG. 10, the side surfaces of the slide member 56 are formed with respective grooves 56c which extend in the longitudinal direction. Projection strips 25c and 26c which are formed on inserting-side (tip-side) portions of the inside surfaces of the first shell 25 and the second shell 26 are inserted in the grooves 56c, respectively. The grooves 56c and the projection strips 25c and 26c allow the slide member 56 to slide without coming off the cartridge body 11.

The front surface 56g of the slide member 56 is formed with, at the shutter-closing-side end, an engagement groove 56m which has a depth D1 and narrows gradually as the position goes from the end surface toward the center. A lock portion 56d to be manipulated in opening the shutter 13 is formed at the innermost position of the engagement groove 56m so as to project by a length D2 in the cartridge 2 inserting direction (i.e., to the front side) from the front surface 56g of the slide member 56. The top surface and the bottom surface of the slide member 56 are formed with groove-shaped lightening portions 56n. As a result, the slide member 56 can be made thick, and a substantial height (D1+D2) of the lock portion 56d which is to engage a shutter opening/closing roller 43 (described later) can be made sufficient for reliable engagement without making the height D2 of the lock portion 56d unduly large, that is, without projecting the lock portion 56d excessively from the front surface 56g of the slide member 56.

Since the slide member 56 extends from the shutter member 55 in the shutter-closing direction, the lock portion 56d is exposed to the outside instead of hiding behind the third plate portion 12c of the light shield plate 12. The cut 40 of the third plate portion 12c of the light shield plate 12 is formed so as to avoid interference with the lock portion 56d when the shutter 13 is moved to the opening position. The cut 40 increases the movement distance of the shutter 13 when formed in a case that the inner openings 18 and 19 cannot be opened because of an insufficient movement distance of the shutter 13.

From the viewpoint of light shielding ability, it is desirable not to form the cut 40. Even in the case where the cut 40 is formed, sufficient care should be taken so that the light shielding ability is not lowered, that is, the end 40a of the cut 40 is as distant from the edges 18a and 19a of the inner openings 18 and 19 in the shutter closing direction as possible.

Figure 8A:
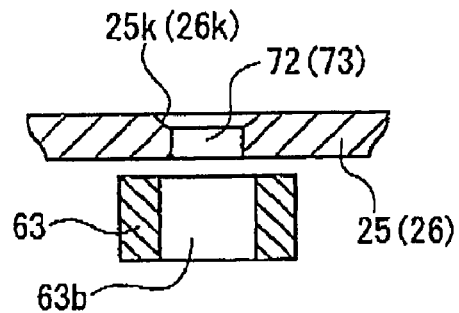
FIGS. 8A and 8B are sectional views taken along line VIII-VIII in FIG. 1 and as viewed in the direction indicated by arrows.
Figure 8B:
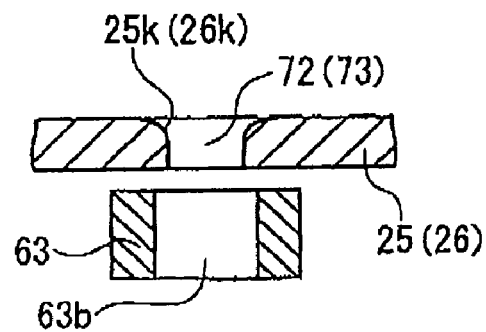
Figure 9:
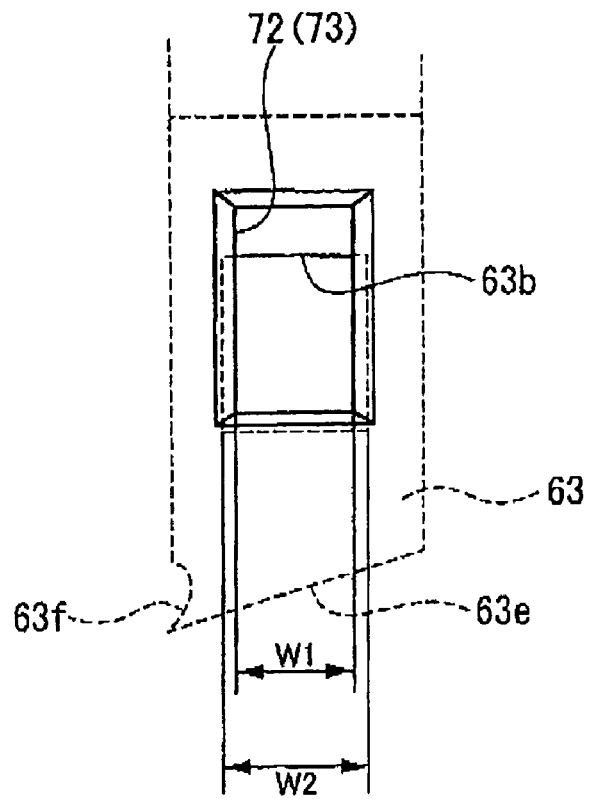
FIG. 9 is a plan view taken along line IX-IX in FIG. 1 and as viewed in the direction indicated by an arrow.
Figure 11:
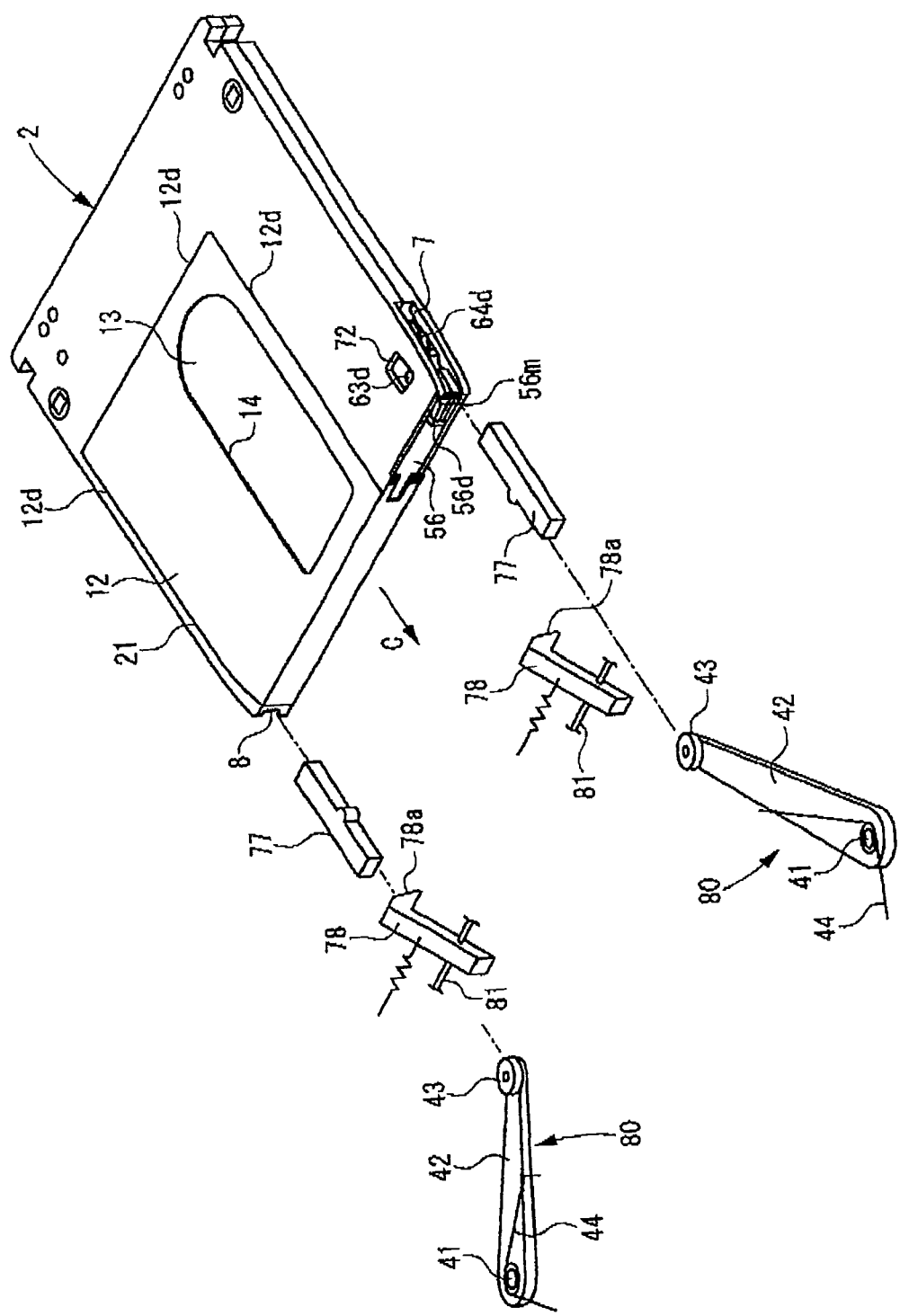
FIG. 11 is an exploded perspective view of an example of various mechanisms for opening the shutter.
Figure 12A:
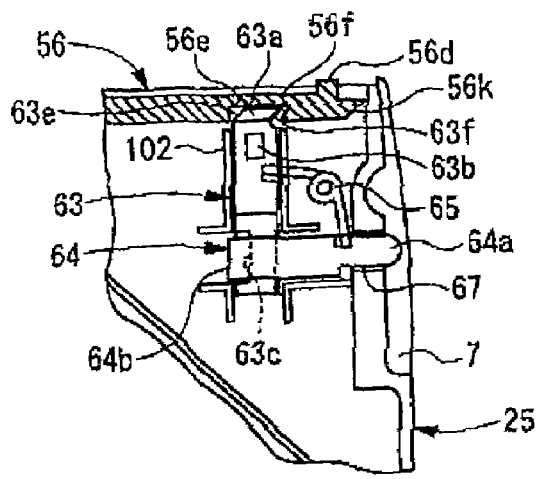
FIGS. 12A, 12B and 12C are explanatory diagrams illustrating the operation of the lock mechanism.
Figure 12B:
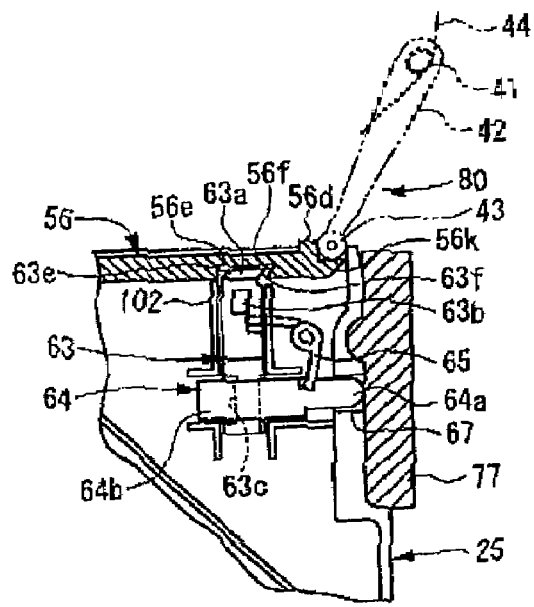
Figure 12C:
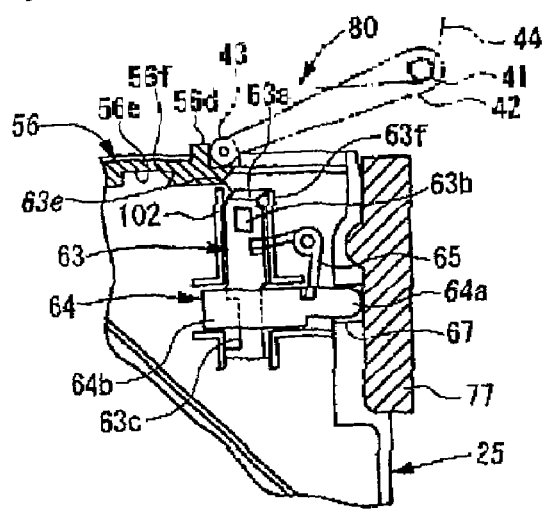
Figure 13:
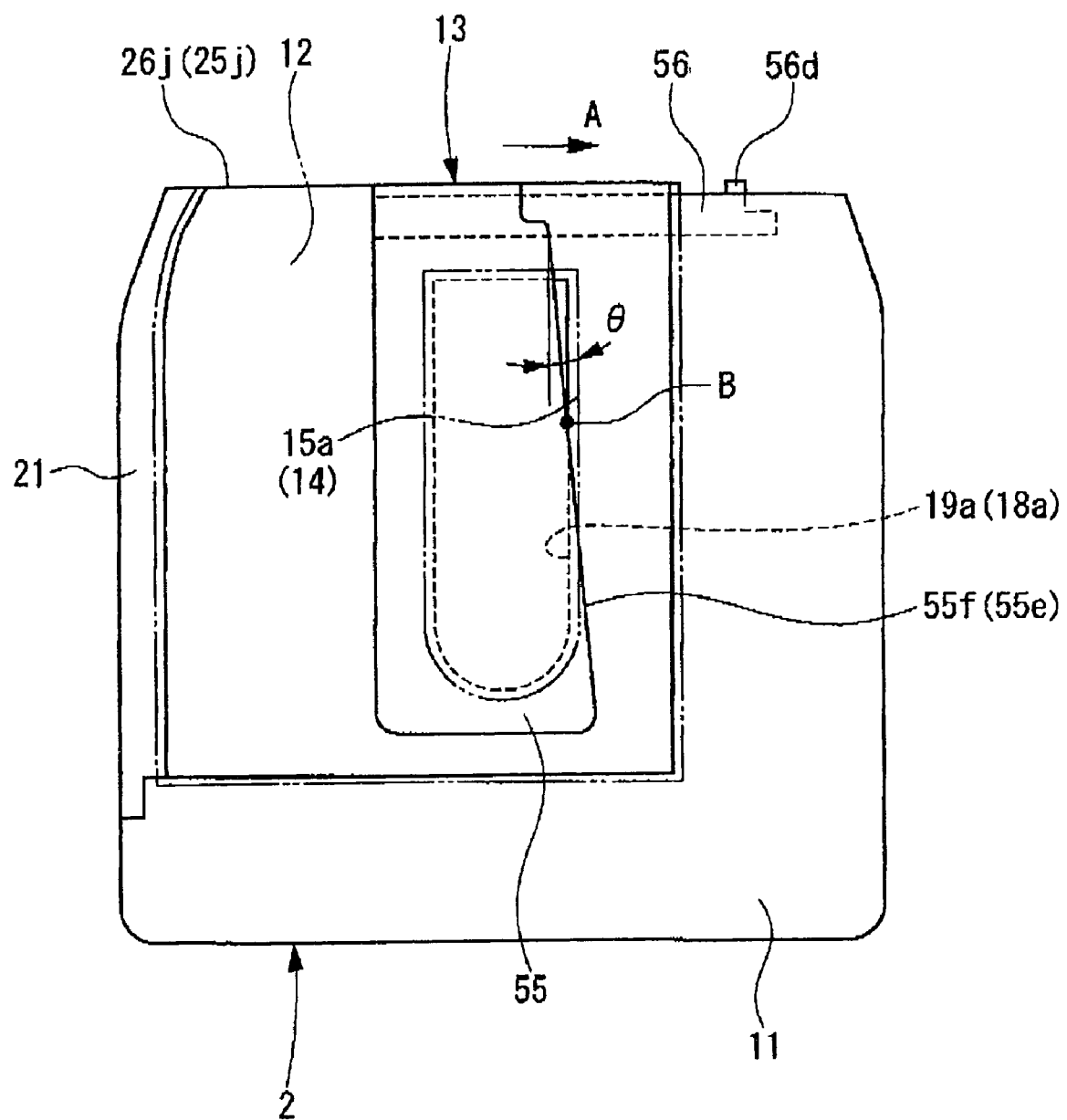
FIG. 13 is an explanatory diagram illustrating a shutter closing operation.

Next, a lock mechanism and a shutter opening mechanism will be described with reference to FIG. 8A to FIG. 13. FIG. 8A and 8B are sectional views taken along line VIII-VIII in FIG. 1 and as viewed in the direction indicated by arrows. FIG. 9 is a plan view taken along line IX-IX in FIG. 1 and as viewed in the direction indicated by an arrow. FIG. 10 is an exploded perspective view showing the structure of the lock mechanism. FIG. 11 is an exploded perspective view of an example of various mechanisms for opening the shutter. FIGS. 12A, 12B and 12C are explanatory diagrams illustrating the operation of the lock mechanism. FIG. 13 is an explanatory diagram illustrating a shutter operation.

As shown in FIG. 10, a recess 56e is formed in the slide member 56 adjacent to the engagement portion 56d. The right side surface (as viewed in FIG. 10) of the recess 56e is an engagement slant surface (engagement portion) 56f which is inclined in such a manner that its width in the shutter closing direction increases as the position goes forward in the cartridge inserting direction. That portion of the slide member 56 which connects the right end surface and the bottom surface (as viewed in FIG. 10) is chamfered into a guide slant surface 56k which is approximately parallel with the engagement slant surface 56f.

The lock mechanism 27 is composed of the first lock member 63 for locking the shutter 13 at the closing position, the second lock member 64 for locking the first lock member to prevent its movement, and a lock spring 65 for urging the first lock member 63 upward (as viewed in FIG. 10) and urging the second lock member 64 rightward (as viewed in FIG. 10).

Being incorporated in a slide frame 102 which is provided in the first shell 25, the first lock member 63 is slidable in the longitudinal direction. The first lock member 63 is provided with a lock piece 63a (tip portion) for locking the shutter 13 by engaging with the recess 56e of the slide member 56, a rectangular manipulation hole 63b which is seen from the outside through the opening 72, and a fitting groove 63c which is formed in a side surface of the first lock member 63 and fitted with the second lock member 64.

The second lock member 64 is incorporated in the slide frame 102 so as to be placed on the first lock member 63 and is slidable in the horizontal direction. A tip portion 64a of the second lock member 64 is generally triangular and projects through a cut 67 of the positioning groove 7. The second lock member 64 has a restriction projection 64b (tail portion) and a groove 64c, and the first lock member 63 is fitted into the groove 64c of the first lock member 63 and is movable in the vertical direction.

The top surface of the lock piece 63a of the first lock member 63 is a slant surface 63e which is formed so as to be approximately parallel with the engagement slant surface 56f of the slide member 56 and which serves to induce engagement with the recess 56e when the shutter 13 is moved from the opening position to the closing position. A hook portion 63f as a slant surface that is approximately parallel with the engagement slant surface 56f of the recess 56e is formed on the right of the lock piece 63a (as viewed in FIG. 10). When the slide member 56 is moved leftward (shutter opening direction) in FIG. 10, the engagement slant surface 56f comes into engagement with the hook portion 63f, whereby further movement of the slide member 56 is prevented reliably. The first lock member 63 and the second lock member 64 are urged upward and rightward, respectively, by the lock spring 65 in which a pin 110 is inserted.

For example, as shown in FIG. 11, a pair of positioning members 77, a pair of lock cancellation arms 78 for manipulating the first lock members 63, and a pair of shutter opening mechanisms 80 for sliding the shutter 13 between the opening position and the closing position are incorporated in a hologram recording apparatus (driving device) which is used with the cartridge 2 inserted therein. The pair of positioning members 77 engaged the positioning grooves 7 and 8 of the two respective side surfaces of the inserted cartridge 2 and thereby position the cartridge 2 in the cartridge 2 inserting direction and the direction perpendicular to it.

Each of the lock cancellation arms 78 is a generally L-shaped member which is swingable on a shaft 81 which is fitted into one end portion of the lock cancellation arm 78. A tip projecting portion of each lock cancellation arm 78 has a slant surface 78a. When the lock cancellation arms 78 are swung and one of the tip projecting portions is inserted into the rectangular manipulation hole 63b of the first lock member 63 through the opening 72 of the cartridge 2, the slant surface 78a pushes the cartridge-removing-side surface of the rectangular manipulation hole 63b and thereby moves the first lock member 63 in the cartridge removing direction (downward in FIG. 10) Recording can be performed on both surfaces of the recording disc 4, and hence the cartridge 2 can be set in the apparatus with either of the A-surface 2a and the B-surface 2b up. However, the position of the lock mechanism 27 is reversed (it is located on the right side or left side) depending on which of the A-surface 2a and the B-surface 2b is located up. In view of this, the lock cancellation arms 78 include one for inverted mounting of the cartridge 2 so that the projecting portion of one of the lock cancellation arms 78 can engage the rectangular manipulation hole 63b even in the case where the cartridge 2 is mounted with inverted orientation.

Each of the shutter opening mechanisms 80 has a shutter arm 42 which is provided so as to be rotatable about a supporting point pin 41 which is disposed outside the side surface of the cartridge 2 to be inserted. A shutter opening/closing roller 43 as a shutter opening member is provided rotatably at the tip of each shutter arm 42, and the shutter opening/closing roller 43 is urged by a coil spring 44 in such a direction as to contact the engagement groove 56m. To cope with inverted insertion of the cartridge 2, the shutter opening mechanisms 80 are also provided in a symmetrical manner.

As shown in FIGS. 8A and 8B, the outer circumferential edge of each of the openings 72 and 73 of the cartridge body 11 which make the rectangular manipulation hole 63b of the first lock member 63 viewable from the outside is chamfered or R-chamfered into a chamfered portion 25k or 26k. As shown in FIG. 9, the width W2 of the rectangular manipulation hole 63b is set greater than the width W1 of the openings 72 and 73. As a result, when the tip projecting portion of one of the lock cancellation arms 78 is inserted into the opening 72 or 73, it is inserted smoothly being guided by the chamfered portion 25k or 26k. Furthermore, the tip projecting portion (in particular, both its side portions) of the lock cancellation arm 78 is inserted into the rectangular manipulation hole 63b without interfering with the inside surface of the rectangular manipulation hole 63b and is fitted into the rectangular manipulation hole 63b.

As shown in FIG. 12A, while the cartridge 2 is not in use, the tip portion 64a of the second lock member 64 is urged by the lock spring 65 and thereby projected into the positioning groove 7 through the cut 67. In this state, the restriction projection 64b of the second lock member 64 is engaged with the fitting groove 63c of the first lock member 63 and thereby prevents the first lock member 63 from sliding downward.

As shown in FIG. 12B, when the cartridge 2 is inserted into a hologram recording apparatus or the like, the tip portion 64a is pushed by one of the positioning member 77 being inserted into the positioning groove 7, whereby the second lock member 64 is pushed into the cartridge 2 and the restriction projection 64b goes out of the fitting groove 63c. As a result, the first lock member 62 is rendered slidable downward. At the same time, one of the shutter opening/closing rollers 43 is located at a position corresponding to the engagement groove 56m.

As shown in FIG. 12C, when one of the lock cancellation arms 78 provided in the apparatus is inserted into the rectangular manipulation hole 63b of the first lock member 63, the first lock member 63 is pushed by the slant surface 78a of the lock cancellation arm 78 and thereby slid downward. As a result, the lock piece 63a goes out of the recess 56e of the slide member 56 and hence the shutter 13 is rendered movable. At the same time, the shutter opening/closing roller 43 is fitted into the engagement groove 56m.

When the cartridge 2 is inserted further, the shutter arm 42 is pressed against the cartridge 2 and rotated clockwise against the elastic force of the coil spring 44. At this time, the shutter opening/closing roller 43 is moved leftward in FIGS. 12A, 12B and 12C (toward the center line of the cartridge 2) while being guided by the engagement groove 56m in which it is fitted and thereby being restricted in the position in the direction perpendicular to the paper surface of FIGS. 12A, 12B and 12C. The shutter opening/closing roller 43 pushes the engagement portion 56d and thereby opens the shutter 13.

At this time, the substantial height (engagement height) of the engagement portion 56d which is in engagement with the shutter opening/closing roller 43 is equal to the sum (D1+D2) the depth D1 of the engagement groove 56m and the projection height D2 of the engagement portion 56d as measured from the top surface of the slide member 56. Therefore, the engagement height (D1+D2) of the engagement portion 56d can be increased without increasing the height D2 of projection from the cartridge 2, and the engagement portion 56d and the shutter opening/closing roller 43 are engaged with each other reliably.

The width of the engagement groove 56m decreases gradually as the position comes closer to the center line of the cartridge 2. Therefore, even it the position of the shutter opening/closing roller 43 is somewhat deviated in the thickness direction of the cartridge 2, the shutter opening/closing roller 43 can easily be fitted into the engagement groove 56m. Furthermore, as the shutter opening/closing roller 43 is moved toward the engagement portion 56d, the position of the shutter opening/closing roller 43 in the thickness direction is corrected by the gradually narrowed engagement groove 56m and the shutter opening/closing roller 43 is brought into contact with the engagement portion 56d reliably. The shutter opening/closing roller 43 thus opens the shutter 13.

In the lock mechanism 27 according to the embodiment, the engagement slant surface 56f and the hook portion 63f are inclined in such directions as to be engaged with each other more strongly as the slide member 56 is moved in the shutter 13 opening direction. Therefore, opening of the shutter 13 is prevented reliably. Furthermore, two-step manipulations are needed to unlock the shutter 13, which prevents the shutter 13 from being opened inadvertently.

Next, a closing operation of the shutter 13 will be described. As shown in FIG. 13, the shutter-closing-side ends 55e and 55f of the shutter 13 are inclined from the inner opening closing-side edges 18a and 19a of the inner openings 18 and 19 by the angle θ, respectively. Therefore, in a plan view, the shutter-closing-side ends 55e and 55f always intersect the inner opening closing-side edges 18a and 19a at one point (intersecting point B) when the shutter 13 is moved in the closing direction (indicated by arrow A). Likewise, the shutter-closing-side ends 55e and 55f of the shutter 13 are also inclined from the outer opening closing-side edges 14a and 15a of the shield plate 12 by the angle θ, respectively. Therefore, in a plan view, the shutter-closing-side ends 55e and 55f always intersect the outer opening closing-side edges 14a and 15a at one point (intersecting point B) when the shutter 13 is moved in the closing direction. Since a gap is usually secured between the cartridge body 11 and the shield plate 12, the shutter 13 can open and close the inner openings 18 and 19 by moving in the gap without interfering with the cartridge body 11 or the light shield plate 12.

Should the shutter 13 (shutter member 55) be brought into contact with the inner opening 18 or 19 or the outer opening 14 or 15 because, for example, it is somewhat deformed in the thickness direction, as the shutter 13 is closed (i.e., moved in the direction indicated by arrow A) it is guided by the inner opening closing-side edge 18a or 19a or the outer opening closing-side edge 14a or 15a and the intersecting point B moves from the one end of the shutter-closing-side end 55e or 55f to the other end. That is, a phenomenon that in closing the shutter 13 the shutter-closing-side end 55e or 55f is brought into contact with the inner opening closing-side edge 18a or 19a or the outer opening closing-side edge 14a or 15a to obstruct the movement of the shutter 13 can be avoided, which phenomenon may occur in the case where the shutter-closing-side ends 55e and 55f are parallel with the inner opening closing-side edges 18a and 19a and the outer opening closing-side edges 14a and 15a. The shutter 13 can thus be closed smoothly.

Although in the above description the shutter-closing-side ends 55e and 55f are inclined by setting the top width WU of the first shutter 55a and the second shutter 55b smaller than their bottom width WD, the shutter closing-side ends 55e and 55f may be inclined in an opposite manner, that is, by setting the top width WU greater than the bottom width WD. Another modification is possible in which the shutter-closing-side ends 55e and 55f of the first shutter 55a and the second shutter 55b are formed so as to be perpendicular to the connecting portion 55c (i.e., θ=0) and the inner opening closing-side edges 18a and 19a and the outer opening closing-side edges 14a and 15a are inclined by the angle θ.

As described above, in the cartridge 2 for a photosensitive recording medium according to the invention, the shutter-13-closing-side ends 55e and 55f and the inner opening closing-side edges 18a and 19a of the inner openings 18 and 19 of the cartridge body 11 and/or the outer opening closing-side edges 14a and 15a of the outer openings 14 and 15 of the light shield plate 12 are inclined from each other. Therefore, in a plan view, the shutter-closing-side ends 55e and 55f always intersect the inner opening closing-side edges 18a and 19a and/or the outer opening closing-side edges 14a and 15a at one point B. The shutter-closing-side end 55e or 55f does not interfere with and, instead, is guided by the inner opening closing-side edge 18a or 19r or the outer opening closing-side edge 18a or 19a; the shutter 13 is moved in the closing direction. As a result, the shutter 13 is closed smoothly and the hologram recording medium 4 is prevented from being exposed to light inadvertently.

Although the above description is directed to the exemplary cartridge which houses a double-side-recordable recording disc, the invention can also be applied to a cartridge which houses a single-side-recordable recording disc. In this case, openings are formed on only one side and opened and closed by a shutter. Furthermore, although the above description is directed to the exemplary cartridge which houses a hologram recording medium, the invention can also be applied to a cartridge which houses another type of photosensitive recording medium.

This application is based on Japanese Patent application JP 2006-16550, filed Jan. 25, 2006, the entire content of which is hereby incorporated by reference, the same as if set forth at length.

What is claimed is:

1. A cartridge for a photosensitive recording medium comprising:
   a cartridge body having a disc accommodation space for accommodating the photosensitive recording medium rotatably and an inner opening for exposing a central portion and a recording surface of the photosensitive recording medium to an outside;
   a light shield plate having an outer opening and fixed to the outside of the cartridge body; and
   a shutter which is provided between the cartridge body and the light shield plate and is movable between a closing position where to close the inner opening and an opening position where to open the inner opening, wherein:
   a closing-side end of the shutter and at least one of a closing-side edge of the inner opening and a closing-side edge of the outer opening are inclined from each other;
   a cartridge-inserting-side width and a cartridge-removing-side width of the shutter are different from each other, so that the closing-side end of the shutter and at least one of the closing-side edge of the inner opening and the closing-side edge of the outer opening are inclined from each other.

2. A cartridge for a photosensitive recording medium comprising:
   a cartridge body having a disc accommodation space for accommodating the photosensitive recording medium rotatably and an inner opening for exposing a central portion and a recording surface of the photosensitive recording medium to an outside;
   a light shield plate having an outer opening and fixed to the outside of the cartridge body; and
   a shutter which is provided between the cartridge body and the light shield plate and is movable between a closing position where to close the inner opening and an opening position where to open the inner opening, wherein:
   a closing-side end of the shutter and at least one of a closing-side edge of the inner opening and a closing-side edge of the outer opening are inclined from each other,
   a cartridge-inserting-side width and a cartridge-removing-side width of at least one of the inner opening and the outer opening are different from each other, so that the closing-side end of the shutter and at least one of the closing-side edge of the inner opening and the closing-side edge of the outer opening are inclined from each other.

* * * * *